United States Patent [19]

Meinke et al.

[11] 4,076,340
[45] Feb. 28, 1978

[54] DRIVE AND BEARING SUPPORT FOR A DISC-SHAPED ROTOR

[75] Inventors: Peter Meinke, Grossinzemoos; Wolfgang Huber, Schweinfurt, both of Germany

[73] Assignees: SKF Kugessagerfabriken GmbH, Schweinfurt; Maschinenfabrik Augsburg-Nurnberg Aktiengesellschaft, Munich, both of Germany

[21] Appl. No.: 595,686

[22] Filed: Jul. 14, 1975

[30] Foreign Application Priority Data

Jul. 12, 1974 Germany .............................. 2433712

[51] Int. Cl.² ............................................ F16C 39/00
[52] U.S. Cl. ........................................ 308/10; 308/9
[58] Field of Search .................. 308/10, 9, DIG. 1

[56] References Cited

U.S. PATENT DOCUMENTS

| | | | |
|---|---|---|---|
| 3,356,425 | 12/1967 | Carriere | 308/10 |
| 3,376,083 | 4/1968 | Muijderman | 308/9 |
| 3,377,113 | 4/1968 | Wilson | 308/10 |
| 3,611,815 | 10/1971 | Fischell | 308/10 |
| 3,663,074 | 5/1972 | Fernlund | 308/9 |
| 3,753,604 | 8/1973 | Arsenius | 308/9 |
| 3,810,683 | 5/1974 | Keever | 308/10 |
| 3,870,382 | 3/1975 | Reinhoudt | 308/9 |
| 3,918,773 | 11/1975 | Tuffias | 308/10 |

Primary Examiner—R. Skudy
Attorney, Agent, or Firm—Haseltine, Lake & Waters

[57] ABSTRACT

An installation for the drive and support of a disc-shaped rotor. The installation for the drive and for the bearing support of a disc-shaped rotor incorporates a constructional element for the magnetic, and particularly electromagnetic, support and drive, which annularly encompasses the rotor in a ring-like configuration, wherein the magnetic support serves primarily for absorption of the radial forces, and that the installation encompasses an aerostatic and/or aerodynamic bearing support for primarily absorbing or receiving the axial forces, and whose rotating portion forms an integral unit with the rotor.

11 Claims, 3 Drawing Figures

DRIVE AND BEARING SUPPORT FOR A DISC-SHAPED ROTOR

FIELD OF THE INVENTION

The present invention relates to an installation for the drive and support of a disc-shaped rotor.

DISCUSSION OF THE PRIOR ART

The durable, inexpensive, noiseless and low-loss support of a disc-shaped rotor affords considerable difficulties and, in particular, when this rotor exhibits a large diameter and must rotate extremely rapidly, due to the thereby resultant high bearing peripheral velocities, in the preferably heretofore utilized mechanical bearings there are generated extraordinarily high forces or stresses which can lead to extensive wear and premature failure. The technical problem in supporting such a rotor is still further enhanced when, for example, this rotor should be accessible from one side thereof, meaning, that it must be supported in an overhung position. In that instance, the rotor is connected or provided on one side thereof with a shaft, on which there is then located the bearing support. When an imbalance occurs during rotor operation, or if the rotor begins to tumble in response to external disturbances, then extremely high bearing forces are generated due to the lever or moment arm. Because of the significant bearing friction, the temperature increase in these supports is extremely high; and in addition thereto, the acceleration up to high rotational speeds requires particular effort, generally in view of the bearing friction, as well as because of the high rotor and bearing masses which are to be accelerated. A typical instance of application for that type of disc-shaped rotor is an energy storage or accumulator. In that type of flywheel which is employed as an energy accumulator there is not limited, as might be assumed, the receiving ability of the rotor energy through the generated centrifugal forces, but rather through the ventilation-and bearing friction which increases with the rotational speed and which, for current rapidly rotating rotors, render the further infeed of additional energy uneconomical.

There are areas of application in which that type of rotor must be frequently exchanged or cleaned. Such type of application is given, for example, for predetermined constructions of wind sifters or separators wherein, in accordance with the goods which are to be separated, there must be inserted a rotor with changed geometry. Finally, there are wind separators which are employed for the separation of the kind of aggressive media wherein, after already a short period of operation, an exchange of the worn out rotor is required. In all these instances it is important that, on the one hand, the rotor is so safely secured that under no circumstances, even under negligent assembly, can it be capable of ripping out of the support while, on the other hand, the rotor must be capable of being exchangeable as rapidly as possible.

In the above-mentioned cases of application, in the presently usual supports an additional difficulty is encountered, in effect, the interaction between the lubricating medium for the support and the medium which is to be treated by the disc-shaped rotor. On the one hand, through the egressing lubricating means, a pulverulent material which is to be separated in the wind separator is, under circumstances, so dirtied as to be either unusable, or undergoes a chemical reaction and thereby changes it properties. On the other hand, an aggressive medium, for example, such as diamond dust may, by penetration into the bearings, completely ruin these within the shortest possible time.

SUMMARY OF THE INVENTION

Accordingly, it is an object of the present invention to provide a bearing support for a disc-shaped rotor which at least partly ameliorates the above-mentioned disadvantages. In particular, it is an object of the invention to provide a bearing support and a drive for a disc-shaped rotor which has a high degree of life expectancy, is practically noiseless, free from wear, may be easily assembled and disassembled, and is not subject to dirtying, as well as not causing any dirtying itself. Furthermore, it is an object of the invention to ascertain a particularly advantageous range of applicability for the above-mentioned type of drive and bearing support installation.

The foregoing object is inventively attained in that an installation for the drive and for the bearing support of a disc-shaped rotor incorporates a constructional element for the magnetic, and particularly electromagnetic, support and drive, which annularly encompasses the rotor in a ring-like configuration, wherein the magnetic support serves primarily for absorption of the radial forces, and that the installation encompasses an aerostatic and/or aerodynamic bearing support for primarily absorbing or receiving the axial forces, and whose rotating portion forms an integral unit with the rotor.

An aerodynamic or aerostatic axial bearing which is driven by air with another suitable gas, operates with the lowest possible wear, hereby for example there may thus be selected an aerodynamic axial bearing wherein there does not exist any great danger of dirtying the bearing; an aerostatic bearing, in contrast therewith, which unrestrictedly flows over the bearing surface through the intermediary of a constant air stream, may be employed wherein there exists an appreciable degree of danger of dirtying the support. Finally, it is of advantage, such as during acceleration of the bearing, when the rotational speed is still insufficiently low for affording an aerodynamic support ability to the bearing, for so long to additionally aerostatically drive the bearing through the infeed of compressed air. Located along the circumference of the rotor is the drive, as well as also the radial bearing support; hereby there are afforded the advantages that, due to the contactless magnetic bearing support, at the latest after acceleration no bearing wear occurs and that, finally, it has also become possible to arrange the bearing at the location at which it can exert a direct centering effect on the rotor. Heretofore, amongst other reasons, the foregoing was not possible in view of not permissible high relative speeds in the bearing. Since the drive and bearing support operate jointly in a common constructional unit, there is achieved complete centering so that the radial force emanating from the drive will not impart a torque or tipping moment to the rotor.

The primary advantage of the invention, however, lies in that a disc-shaped rotor can be used on which there is no requirement other than that its circumferential wall is constituted of a ferromagnetic material. That type of rotor need not provide any kind of bearing journals or other installations which would be necessary for a bearing support. Since the entire bearing support takes place without contact, the bearing operates practically noiselessly. Obviated thereby to a considerable extent is the noise level, particularly at extremely high-speed rotating rotors. Inasmuch as air is employed as the only lubricating medium which, as well as any other protective gas, may be utilized for the driving of the aerodynamic or aerostatic bearing, provision may be made for each range of application of the support, that there will not occur interchange effect damages in the material treated in the rotor through possible chemical reaction with the lubricating medium. Due to the contactless bearing support, only extremely minor friction losses are encountered. Hereby, it becomes possible that a rotor may be accelerated within a very short period to extremely high rotational speed ranges. For machines which are driven with exchangeable rotors, and whose rotors must be frequently exchanged, the last above-mentioned viewpoint signifies a considerable saving of expensive machine "down" or inoperative time.

Inasmuch as the bearing support, as well as also the drive of the rotor engage at the periphery of the latter, there is provided the particular advantage that a rotor which bursts due to erroneous construction or improper material, is caught by means of the drive, respectively, bearing support installation, so that separate safety arrangements, such as, for example, armor plating may be eliminated to a large extent. One embodiment of the invention consists of in that the rotor axis is essential perpendicular or only minutely inclined with respect to the perpendicular, and that the lower radial surface of the rotor either completely or extensively forms the one-half of the lower axial bearing. In this embodiment, the rotor at standstill thereof lies merely loosely within its support and can at any time, in any event after switching off of the magnetic bearing support, be lifted out of its support bed. In that manner not only is the entire radial surface of the rotor maintained free in order to, for example, afford unhindered access for loading or infeed installations to the rotor and to the interior of the rotor, but there is here rendered capable, in a completely particularly advantageous manner, the exchange of rotors without the need for any tools.

The inventive rotor need no longer be centered with the utmost care, as in previous rotors, since with increasing rotational speed it rotates in an increasing manner about its primary support axis, thus, for example, the one-sided or lop-sided loading of a rotor during a processing procedure does not effect itself in an increased bearing force and increased bearing wear, but only in a permissible displacement or shifting of the primary support axis. Hereby, it has become possible, for example, at previously unforeseen operating conditions to run through these critical rotational speeds with a loaded rotor.

A further embodiment of the invention consists of in that the axial bearing and/or radial bearing includes auxiliary bearing slide surfaces with emergency operating characteristics which, in the operating condition of the rotor, are not in contact with the surfaces which are located opposite to the rotor.

The additional bearing glide surfaces, for example, in aerodynamic bearings, provide for a bearing support within the low rotational speed range, in which the carrying or support effect of the bearing is not yet in operation, however, those slide surfaces need not be located only above or below the rotor, but also may be located around the rotor, thus if it should not be possible for the magnetic bearing any longer to fully restrain the rotor, for instance, after a current failure, then those type of contact surfaces have the effect that the rotor may be further run until standstill without incurring any significant damage. Utilized as the materials for those types of slide surfaces may be the usual bearing materials such as, for example, sintered metals in the axial bearings, and respectively, a coating of Teflon within the radial regions, which will not restrict the magnetic force flow. Acceleration and emergency running are thereby controllable through those types of slide surfaces.

A further embodiment of the invention consists of a second rim-shaped axial bearing being located opposite the rotor, and whose periphery lies opposite one of the radial surfaces of the rotor. Since this bearing is operatively effective in the outer region of the rotor, in essence, in the regions of high peripheral speed of the rotor, its carrying or supporting effect comes into play at already a relatively low rotational speed. Hereby, the rotor adjusts itself to a stable median position between the two axial bearings, which may be of important significance for a finishing process which is associated with the rotor such as, for example, the spinning of a thread. Moreover, this axial auxiliary bearing in a rotor with a vertical axis prevents, for example, the jumping out of the rotor from its bearing support at a suddenly occurring imbalance, as well as subsequent to a rotor fracture. Since the requirements for the centering of that type of bearing are not particularly high, that type of bearing may be located so as to be easily removable with the usual installations, so that it will not in any manner prevent the exchange of the rotor; for instance, that type of fastening may consist of a bayonet-fastening of the additional bearing rim or ring portion within the motor-magnetic bearing unit.

It is naturally possible to employ each known type of magnetic bearing support for an inventive unit constituted of a drive and radial bearing support so that it is advantageous, for example, to provide a radial magnetized ring, as viewed in an axial direction, ahead of and behind the coil systems for the drive, in such a manner whereby the repelling radially magnetized zones of the rotor are located opposite thereto. When in that type of arrangement there can concurrently occur particular losses during operation, it is of advantage that types of supports be utilized therein whereby calculation can be had with current failure and similar operating disturbances. Finally, that type of magnetic rings may also be provided as additional centering means to the various magnetic bearing supports.

Within the concept of a further embodiment it is, however, of particular advantage that the constructional unit includes coils for an electromagnetic bearing support and for driving operation, which are effective on a common upright or bearing. Hereby, the bearing support and drive are effective in the same plane so as to prevent the occurrence of any tipping oscillations about the bearing plane.

Within the framework of the further embodiment of the present invention, it is particularly advantageous to utilize the same magnetic coils for radial bearing control, respectively, regulation, and for drive, which operate through attraction on the ferromagnetic rotor. The magnetic coils of the drive, on the one side, are constantly supplied with power so that they generate a rotary field for the drive of the rotor; hereabove there is, however, measured the position of the rotor, and if a deviation occurs in the radial position thereof, then the coil systems are so controlled that an adjustive field is generated in addition to the rotary field whereby the rotor is again returned into its initial position. This effect may be achieved, for example, through the following arrangement:

At least two magnetic coils which serve for the drive are separated about in the middle with an approximately sinusoidally-shaped winding distribution, so that a regulating current can flow through both coil halves in opposite directions, and whereby each coil is concurrently connected to the power supplying alternating-current drive system. Hereby, the rotary currents, in a known manner, flow through the collective coils which possess, at the location of their separation, a bridging current path. A regulating current concurrently flows between the location of the separation and the coils ends of the two coil halves in respectively opposite directions. Produced hereby is a resultant force vector which is directed from the axis of the rotational body towards approximately the location of the separation. This force vector results from continuously divided force components, as they correspond to the induction sequence of the magnetic field in the air gap between the coils and the rotor. For example, the regulating current of the separating location may be supplied across a low-pass filter when some regulating frequencies lie below the frequency of the rotary field. That type of arrangement is particularly of interest for rapidly rotating rotors, when the disturbing oscillations which are to be fought by the regulating system are located at an appreciably lower frequency. However, it is possible to use each other embodiment in which the same magnetic coils are employed, so it is possible, for instance, to separate coil portions which are then not passed through by the driving current and which are held in readiness for the regulating currents. Finally, it is also possible to constantly supply some predetermined coil portions with direct current so that, for example, there may be exerted a constant force, opposite a radially permanently magnetic zone of the rotor. Insofar as losses occur, this force, respectively, the direct current causing it, may also be variable, for example, when at special operating conditions a particularly strong restrictive effect is noticeable. Finally the measuring sensors which are necessary for the control of the active regulating system may be located, for example, between coil systems, or similarly portions of the coil systems may be used as measuring sensors. The important advantage of this embodiment lies in that not only are the drive and regulating forces effective in the same plane so that there will not occur opposite tipping moments but, in the present invention, these forces are effective in the zones in which occur the greatest deflections and the smallest applicable forces. Hereby it is, for example, possible to operate with optimally small regulating installations, since in the present embodiment the regulating currents are particularly low. Finally, another advantage of the unitary coil system lies in that this coil system is relatively inexpensive, and that it is also effective on a non-premagnetized rotor; thereby, in a comfortable manner, there can be found a material for the rotor, since this material, besides the requirements of strength, must be adequate for only relatively small requirements on its ferromagnetic properties, compared with the requirements which the material must have for a permanent-magnetic rotor.

In the inventive embodiment, the collective sensitive or complex portions for the drive and regulation are located exteriorly of the coil system, and may be therefore located remotely from the actual drive so that, in the event of rotor failure, they are not damaged therewith. Finally, it is also possible to provide coil systems of different diameters with plug connectors, so that a machine can be converted within the shortest possible time span to rotors having different diameters. A further embodiment of the invention consists of in that the stationary portion of the axial bearing incorporates magnet pole pieces which operate in conjunction with the upright or bearing of the unit. This construction has the advantage that the lower surface of the rotor is utilized for magnetic flux or flow, this leads, in particular, at extremely flat and low rotors to considerably improved properties then would be possible in the absence of this construction.

Furthermore, through this embodiment there is afforded the capability that axial oscillations of the rotor may be suppressed, since the attractive forces of the regulating magnets also possess an axial component which presses the rotor against the air cushion of the aerodynamic bearing, and which, additionally, may also be controlled. Finally, through this embodiment there may also be effected an important shortening of the coasting period of the rotor in that the attractive force of the regulating magnets is increased during the braking phase so that the rotor is pressed against the slide surfaces of the axial bearing and thereby braked to standstill. Hereby, there may possibly be additionally provided an aperture in the bearing through which, in this case, there may escape the otherwise supporting gas-or air cushion.

A further embodiment of the invention consists of in that the stationary portion of the axial bearing includes a conical surface, and with the radial surface of the rotor being in complementary conformance therewith.

Through this embodiment there is attained that a predetermined portion of the radial forces are already assumed prior to the aerostatic or aerodynamic axial bearing support; this has its significance particularly wherein there must be reckoned with current failure of the regulating system. In this instance, the embodiment of the invention is effective to necessarily center the rotor which thereby, without absorbing any damage, can be safely braked to standstill upon failure of the electromagnetic reguating installation.

A further construction of the invention contemplates that the circumferential surface of the rotor is conically constructed. Through this configuration there is provided the effect that a predetermined portion of the axial forces are produced by the electromagnetic regulating system; hereby, these axial forces generated by the electromagnetic adjusting system can increase or reduce the forces which are effective on the aerodynamic or aerostatic axial bearing. The particular advantage of this configuration lies in that axial oscillations of the rotor are detected by the measuring sensors of the electromagnetic regulating system, and are suppressed by the regulating system. Thereby, the invention is particularly applicable where it is necessary to have a particularly stable axial position in relation to other installations involved in the technical process.

A further embodiment of the invention consists of in that the one upper surface of the axial bearing is provided with automatic or self-pressure generating grooves, for example, with spiral furrows or grooves. Those types of bearings are known per se, but are however of particularly special advantage in connection with an inventive flat rotor since they serve as an aerodynamic bearing support for the extremely stable layer thickness of the supporting or carrying gas which is dependent upon the rotational speed; that type of support thereby prevents large differences in the supporting bearing space and the thereby resultant axial oscillations.

A further construction of the invention consists of in that the spiral furrows are applied to the bearing surface, and in particular are adhesively fastened thereto in the form of foils. Hereby, it becomes possible that either the entire bearing surface may be manufactured from materials with a low friction resistance through an inherently known process, or that the respective surface of the axial bearing may be coated therewith.

For the present invention there is afforded a broad possible range of applications, for example, the use as an energy accumulator is particularly advantageous, wherein the coil systems initially assume the drive of the rotor when the energy accumulator absorbs energy, and then to conduct power output exteriorly through the encompassing magnetic field generated by the rotating rotor. In that type of energy accumulator, the loss through bearing friction is especially low, so that this energy accumulator need not be limited only to use for short-term storage of energy.

A particular advantageous utilization of the invention consists of in that it may be utilized as a spinning turbine centrifuge. Those types of so-called open-end spinning centrifuges consist of a dish-shaped rotor rotating at extraordinarily high speed, in which, for example, liquid plastic material is dropped in so as to form a thread therein. The drive and support of those types of high-speed spinning centrifuges have heretofore caused extremely great difficulties, since the centrifuges must be often assembled in large quantities and must attain extremely lengthy operating periods. The losses which have been encountered through the use of present ball bearings, and which become noticeable in the form of bearing noises, heat, and finally wear, lead in these high-speed spinning centrifuges not only to a high additional energy requirement, but also to reductions in their life expectancies. The inventive installation for the drive and the bearing support of a disc-shaped rotor has its particular advantage in spinning centrifuges in that the drive thereof takes place practically without wear, and that the entire bearing support and the entire drive evinces only a minutely higher constructional height then do the centrifuge rotors. Thereby, on relatively simple support beds or bases there may be assembled a plurality of inventive installations, in which the rotors of stationary centrifuges may be exchanged through only a few manipulations. Furthermore, the diameter of the inventive spinning centrifuge is no larger than the diameter of a previous spinning centrifuge, since in the previous centrifuge the rotor had to be encompassed by armor plate whose task was formed by the drive-and support construction unit.

BRIEF DESCRIPTION OF THE DRAWINGS

Reference may now be had to the following detailed description of the preferred embodiments of the invention, taken in conjunction with the accompanying drawings; in which.

DETAILED DESCRIPTION

Figure 1:
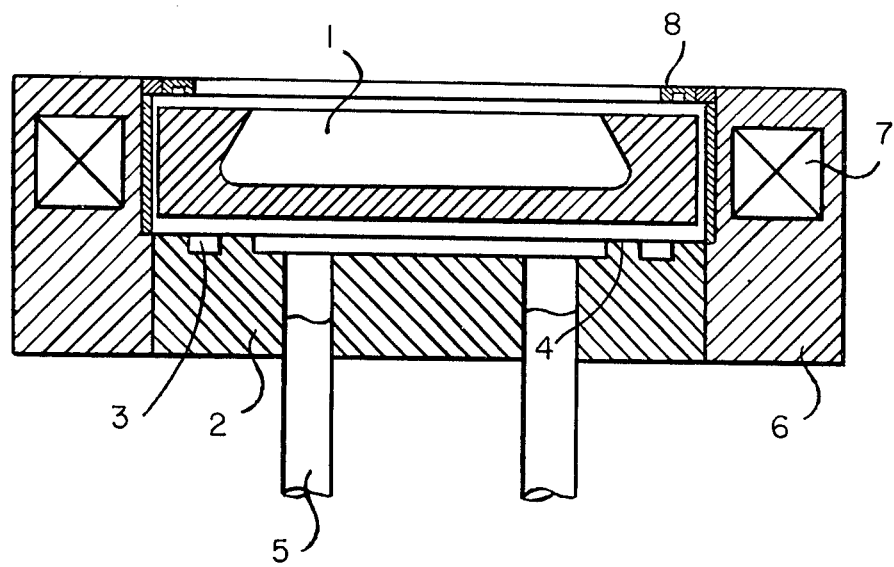
FIG. 1 is a transverse vertical sectional view of a first embodiment of a disc-shaped rotor constructed pursuant to the invention.

FIG. 1 illustrates an exemplary embodiment of an application for the invention. A centrifuge rotor 1 in the form of a disc is formed so as to be dish-shaped interiorly thereof, is constituted of a ferromagnetic material and has a planar bottom, a planar outer surface and an annular cylindrical sleeve-like peripheral surface. This rotor is supported on a bearing plate 2 which includes spirally-shaped extending furrows or grooves 3, whereby the connecting portions between the spiral furrows are provided with a layer 4 of a slidable material, such as Teflon. Through closable conduits 5, compressed air may be introduced below the rotor 1. The rotor is encompassed by an annular ring-shaped frame 6, into which there are cast coil systems 7. The coil systems 7 are so arranged so as to lie exactly opposite the annular cylindrical sleeve-like peripheral surface of the rotor 1 in the operating position of the latter. The coil system 7 comprises two coil assemblies, one used for driving the rotor which is fed current to produce a rotary field which in cooperation with the ferromagnetic rotor drives the rotor, the second coil assembly being disposed to produce in cooperation with the ferromagnetic rotor, a radial magnetic field which tends to hold the rotor in its central position. By means of a suitable high - speed measuring and regulating installation of known type (not shown) the radial spacing between the rotor and the encompassing annular frame 6 is controlled and the current for the coil assembly is regulated to produce corresponding restoring forces. These coil systems 7 assume the function of the drive, the radial bearing measurement, as well as the radial bearing control. The coil systems thus constitute a unitary means for magnetic bearing support and drive of the rotor. The control over these coil systems 7 is carried out by means of a suitable high-speed measuring-and-regulating installation (not shown). Detachably located above the upper surface of the rotor is an annular ring-like rim 8 which is provided with spiral furrows or grooves.

In initiating operation of the installation, the rotor 1 initially rests on the slide surfaces 4. The radial bearing regulation is then actuated and from below pressurized air is conveyed through the conduits 5 to form a gas cushion for axial support of the rotor. The rotor lifts away from the support surfaces 4 and assumes its initial static position. The drive is then actuated so as to quickly place the rotor into rapid rotation. Upon attaining a predetermined rotational speed, the rotor presently commences to form a supporting air cushion with its lower surface along the edges of the spiral furrows 3, so that the conduits 5 can then be shut off. In the same manner, a dynamic pressure cushion is formed below the bearing rim 8, so that the rotor is maintained in a stable median position between the two cushions. When the drive becomes sufficiently strong, respectively, the frictional force between the rotor bottom surface and the Teflon surfaces 4 is sufficiently low, then the rotor may be also accelerated without any initial aerostatic bearing support; in effect, the pressurized air conduits 5 become thereby superfluous. Additional slide surfaces 9 are provided on frame 6 to face the periphery of rotor 1 and the slide surfaces are contactless with respect to the rotor surfaces during operation of the rotor.

If the rotor is to be removed, then after the detaching or loosening of a simple clamping arrangement (not shown), the bearing rim 8 is removed, and the stationary rotor is lifted out upwardly.

Figure 2:
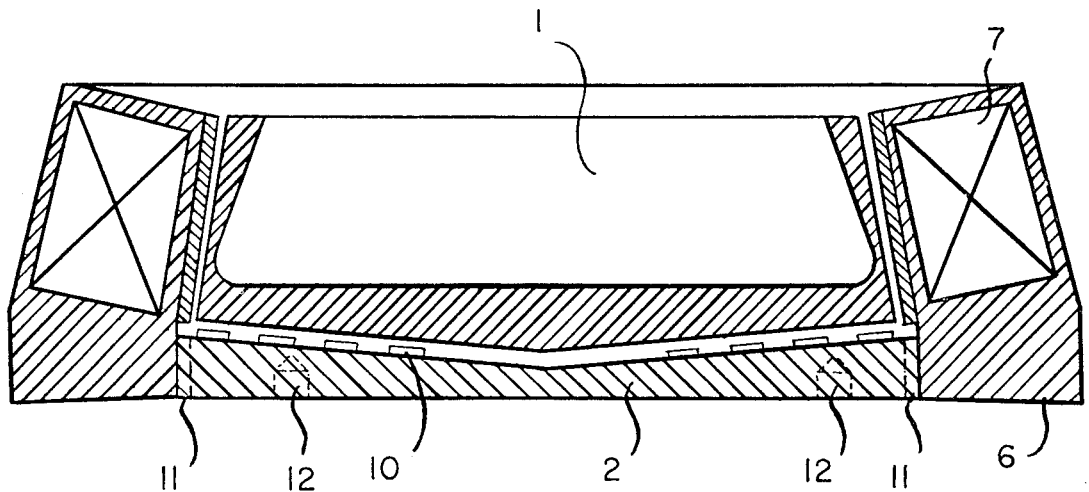
FIG. 2 is a sectional view of a modified embodiment of the rotor.

FIG. 2 illustrates an installation in which the rotor 1 has a conical peripheral surface wherein, in correlation therewith, the annular ring-shaped frame 6, which includes the coil system 7, has the inner surface conically shaped in a complementary configuration. Furthermore, the lower radial surface of the rotor 1 is also constructed slightly conically and, in correlation therewith, also the bearing plate 2; with the upper surface of the bearing plate 2 being provided with spiral furrows or grooves 10 constituted of material having a low friction value and high wear resistance. In order to facilitate the exchange replacement of the rotor, the bearing plate 2 is fastened in the annular ring-shaped frame 6 by means of bayonet connector 11, while two blind holes 12 in the lower surface of the bearing plate 2 serve for the application of a work tool.

Figure 3:
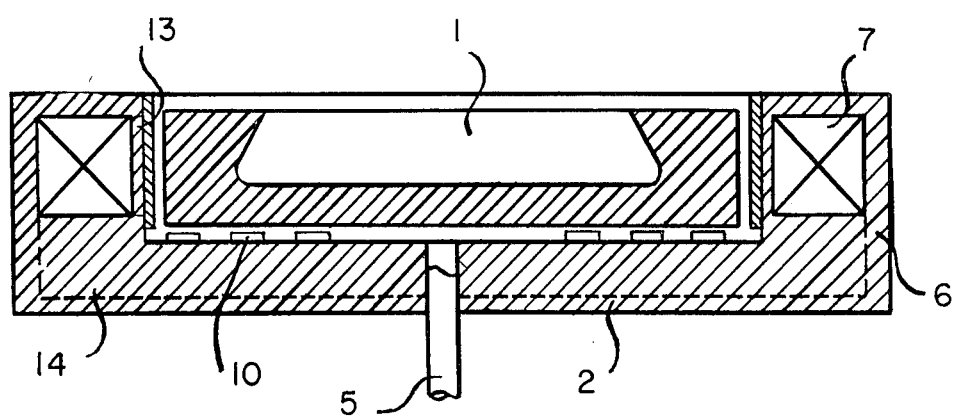
FIG. 3 is a sectional view of a third embodiment of the rotor.

FIG. 3 shows a further exemplary embodiment of the invention. The rotor 1, in a similar manner to that in FIG. 1, is located within the coil system 7; the coils are effective on an essentially ring-shaped upright or bearing 13, whose surface is located opposite the external surface of the rotor. Connected with the upright 13 are pole pieces 14 which, from below, attractively affect the rotor. For braking of the rotor, the magnetic flow is increased through the upright or bearing 13, rotor 1 and magnetic pole pieces 14, and the central conduit 5 is opened; hereby, the aerodynamic air cushion escapes from below the rotor 1, and the rotor 1 is pressed against the furrows 10.

The invention does not only relate to the spinning centrifuges of the illustrated embodiment, but to spinning centrifuges in general; moreover, the invention expressly also relates to the use of the inventive installation with regard to energy accumulators.

While there has been shown what is considered to be the preferred embodiment of the invention, it will be obvious that modifications may be made which come within the scope of the disclosure of the specification.

What is claimed is:

1. In combination, a disc-shaped rotor and a frame surrounding said rotor, said rotor having upper and lower radial surfaces and a peripheral surface, unitary means supported by said frame for magnetic bearing support and drive of said rotor, a plate facing said lower surface of the rotor and means coupled with said plate for producing a gas cushion for axial support of said rotor, said means for producing the gas cushion comprising at least one closable conduit having an end facing said lower surface of said rotor, said unitary means comprising a common annular coil system surrounding said rotor and disposed exactly opposite the rotor for effecting rotary drive of said rotor while suspending said rotor by magnetic effect independently of the gas cushion producing means and with the conduit closed, said conduit being openable during rotation of said rotor for applying a braking effect on said rotor.

2. An installation as claimed in claim 1, said frame includes magnetic pole pieces supporting said common annular coil system.

3. An installation as claimed in claim 2, wherein said coil system comprises magnetic coils for effecting radial bearing control and drive of said rotor.

4. An installation as claimed in claim 1, said frame including slide surfaces which are contactless with respect to oppositely located surfaces on said rotor during operation of said rotor.

5. An installation as claimed in claim 1, comprising an annular rim detachably mounted on said frame above the periphery of the upper radial surface of said rotor.

6. An installation as claimed in claim 1, wherein said radial surfaces are planar and said peripheral surface is cylindrical, said frame having a cylindrical surface surrounding said rotor and said plate having a planar surface facing the lower surface of said rotor.

7. An installation as claimed in claim 1, wherein said plate has a conical surface, said lower radial surface of said rotor facing said conical surface and having a corresponding conical shape.

8. An installation as claimed in claim 1, wherein said peripheral surface of the rotor is conical, said frame having a surface surrounding said peripheral surface which corresponds thereto in conical shape.

9. An installation as claimed in claim 1, wherein said plate has grooves therein.

10. An installation as claimed in claim 9, said grooves being spirally-shaped.

11. An installation as claimed in claim 1, said rotor constituting a spinning centrifuge.

* * * * *